United States Patent [19]

Schmid et al.

[11] Patent Number: 5,747,634
[45] Date of Patent: May 5, 1998

[54] CONTINUOUS PROCESS FOR ACTIVATED ANIONIC LACTAM POLYMERIZATION

[75] Inventors: Eduard Schmid, Bonaduz, Switzerland; Roman Eder, Filderstadt, Germany

[73] Assignee: EMS-Inventa AG, Zurich, Switzerland

[21] Appl. No.: 786,711

[22] Filed: Jan. 21, 1997

[30] Foreign Application Priority Data

Jan. 25, 1996 [DE] Germany ............... 196 03 303.9

[51] Int. Cl.$^6$ ............... C08G 69/08; C08G 73/10
[52] U.S. Cl. ............ 528/315; 528/312; 528/314; 528/323; 528/324; 528/326; 264/143; 264/144
[58] Field of Search ............ 528/315, 312, 528/314, 323, 324, 326; 264/143, 144

[56] References Cited

U.S. PATENT DOCUMENTS

| | | |
|---|---|---|
| 3,575,938 | 4/1971 | Tierney . |
| 3,674,751 | 7/1972 | Krohcek et al. ............ 528/312 |
| 4,171,425 | 10/1979 | Lew ............ 528/315 |
| 4,171,426 | 10/1979 | Lew ............ 528/312 |
| 4,180,650 | 12/1979 | Lew ............ 528/313 |
| 4,191,819 | 3/1980 | Meyer et al. ............ 528/315 |
| 4,195,163 | 3/1980 | Meyer et al. ............ 528/315 |

OTHER PUBLICATIONS

German Abstract, "Farben und Lacke", pp. 911–915.

*Primary Examiner*—Duc Truong
*Attorney, Agent, or Firm*—Browdy and Neimark

[57] ABSTRACT

A continuous process for activated anionic lactam polymerization is proposed, wherein a liquid system is employed, which simultaneously contains activator and anionic catalyst for the polymerization of lactam.

22 Claims, No Drawings

CONTINUOUS PROCESS FOR ACTIVATED ANIONIC LACTAM POLYMERIZATION

FIELD OF THE INVENTION

The invention relates to a continuous process for activated anionic lactam polymerization, and to shaped polyamide bodies which can be produced by means of the continuous process.

BACKGROUND OF THE INVENTION

In accordance with the relevant prior art, polylactams and polyamides are mainly produced in accordance with the method of so-called hydrolytic polymerization from molten lactams at temperatures of approximately 200° to 320° C., wherein often a pressure phase with the addition of water for opening the lactam ring corresponds to the first step of the reaction that proceeds slowly. The reaction product, preferably a granular material, is converted to useful articles in a subsequent step, for example by means of an injection molding or extrusion process.

Strong bases which, for example, can lead to the formation of metal lactamate, can also cause the conversion of lactam to polyamide. The corresponding polymerization reaction proceeds slowly and was replaced by the activated anionic lactam polymerization, wherein the reaction is greatly accelerated and the polymerization temperature can be lowered below the melting point of the polymer. In this method the catalyst and activator are separately added to the molten lactam.

Customarily, the catalyst usually is present as a solid, for example an alkali- or alkali-earth-lactamate. Also, many of the activators (or co-catalysts), such as carbodiimide and blocked isocyanates, are solids. The disadvantage of the free isocyanates, many of which are liquids, is their high toxicity.

The anionic lactam polymerization and the activated anionic lactam polymerization are described, for example, in the Plastics Manual, Volume VI, Polyamides, C. Hanser, publishers, München.

The activated anionic lactam polymerization is generally performed for producing so-called castings or semi-finished parts of large dimensions, such a profiles, preferably in accordance with the so-called 2-tank method.

Herein, respective lactam melts of the same volume and containing the catalyst or the co-catalyst are produced, combined and intensely mixed. The polymerization is started by this and the melt can be processed immediately thereafter into finished parts, for example by means of the so-called monomer casting method.

In this process it is necessary to observe as much as possible that the lactam melts are free of water and oxygen, the mixing and processing steps take place in an inert gas, and the activated melt is very quickly processed, since it has only a limited time for processing.

So-called liquid catalyst systems were developed to ease the rapid and homogeneous distribution of the catalyst, for example magnesium or sodium lactamate, in the lactam melt.

Reference is made in German Patent Publication DE-22 30 732 C3 to the difficulties caused by the addition of catalysts in solid form, for example metal lactamate, to the activator-containing lactam melt. An inhomogeneous polymer with unacceptably poorly reproductible properties results.

To solve the problem, a solution of alkali lactamate in lactam, which is liquid at 90° C., which additionally contains 0.3 to 5.0 weight-% of a low-volatile amine, is proposed by German Patent Publication DE-A-14 95 132.

The dissolving of a catalyst of metal lactamate in an N,N-disubstituted urea, in particular in N-methylpyrrolidone, is described in U.S. Pat. No. 3,575,938. The improved addition and distribution of this catalyst solution in an activated lactam melt also permits the production of mineral-filled products.

In accordance with the teachings of the already mentioned German Patent Publication DE 22 30 732 C3 it is necessary to prevent the crust formation, quickly exhibited by catalyst solutions made of alkali lactamate in 2-pyrrolidone and which interferes with the process, by the addition of higher alcohols.

Catalyst solutions with a high degree of stability when stored even at low temperatures are described in European Patent Publication EP 0 438 762 B1, which allow a rapid reaction and lead to polyamide with a relatively low amount of extractable content. They consist of lactam, 2-pyrrolidone and further additives, such as special glycols, hydrocarbons and selectively amines, which affect the properties of the polymer.

However, in the cited prior art it is necessary to add the solutions of the activator and the catalyst separately.

A preferred way of proceeding here is that first a homogeneous solution of the activator and, if required, further additives, in an anhydrous lactam melt is prepared and, in a further process step for initiating the polymerization reaction, the catalyst, preferably dissolved in lactam, is added and is homogeneously distributed in the melt.

In this case high demands are made on the freedom of the solutions from oxygen and water: mixing in the reaction vessel and processing must be performed in a dry inert gas.

Since, for sufficiently short reaction times in the process, accelerators are also required besides the catalyst, it is necessary to operate in accordance with exactly fixed ways of proceeding.

In a general procedure melts of about equal volume are produced, which contain dissolved either the catalyst or the activator. Next, the melts are mixed the accelerated polymerization step is initiated. The disadvantage of these processes is that it is necessary to prepare two different melts in two different vessels, wherein the catalyst-containing melt has only a limited usable period, even in the absence of the activator. After pouring them together, only a limited pot live remains for processing in which the melt is of sufficient low viscosity, so that no intermediate storage of the activated melt is possible, and the shaping, for example in a casting process, must take place immediately.

In other processes it is necessary to empty the two vessels with a catalyst or activator respectively, to intermix the melts continuously in a mixing step and to subsequently process the activated melt.

Here, too, the problems of the limited storage time of the melts is present.

In further processes in accordance with the prior art, for example in accordance with U.S. Pat. No. 3,575,938, the activator and selectively dry additives, such as fibers, are mixed into the lactam melt and the catalyst solution is added in a subsequent step and homogeneously distributed by intense mixing. This way of adding and distributing is made easier if it is possible to work with a catalyst solution. However, the process still remains a multi-step one.

OBJECT AND SUMMARY OF THE INVENTION

It is the object of the instant invention to overcome the disadvantages of the prior art by means of a continuous polimerisation process and a new catalyst-aktivator system, and thereby simplify the performance of the process and its applications.

This object is attained by means of the continuous process for activated anionic lactam polymerization having the characterizing features of claim 1, and by the polylactams produced in this way in accordance with claim 14.

It is particularly attained by means of a process which can be continuously performed by using a system which is stable when stored and liquid at room temperature, which simultaneously contains the activator and the catalyst for the anionic lactam polymerization, which makes the use of separate solutions with the activator or the catalyst unnecessary and therefore assures to the activated alkaline lactam polymerization a considerable expansion of the applications, the formulation and the production parameters and in the shaping steps. In this case it is particularly advantageous that, besides the activator/catalyst liquid system, it is only necessary to have the lactam, or its pure melt, which is stable in storage, on hand, which is catalyzed and activated in one step directly before shaping by the continuous addition of only one liquid system.

The process in accordance with the invention is performed for with lactams, preferably with caprolactam and enatholactam, and in particular with laurinlactam.

On stirring the melt, the liquid system is rapidly and evenly distributed in the lactam melt and initiates the polymerization homogeneously and rapidly.

This represents a considerable advantage, in particular in connection with laurinlactam, which must be stored before processing above its melting point of almost 160° C. and thus, reducing greatly its storage time. In the presence of a catalyst, is greatly limited in its storage time.

For the process in accordance with the invention, a single storage tank for the molten lactam is therefore sufficient which, free of the catalyst or activator, can be easily stored in an inert gas atmosphere for a long period of time.

Because of the use of the liquid system, the continuous process in accordance with the invention is excellently suited for the continuous shaping of the polymeric melt of polylactams, particularly of polycaprolactam and polyenantho-lactam, and in particular of polylaurinlactam and their mixtures, which is possible because of the high polymerization speed of the process.

The liquid system which in accordance with the process of the invention is to be added to a anhydrous lactam melt essentially consists of a) 20 to 80 parts by weight of a1) at least one N-substituted carboxylic acid amide compound, and/or a2) at least one N,N'-disubstituted urea compound, both of which can also contain a heterocyclic ring formed by their substituents, as the base component and solvent, b) 5 to 30 parts by weight of at least one alkali or alkali earth lactamate as the catalyst, c) 5 to 30 part by weight of at least one compound activating the anionic lactam polymerization, wherein a), b) and c) add up to 100 parts by weight, and additionally selectively of d) process and/or use-dependent additives and admixtures, which do not affect polymerization or only to the desired, foreseeable degree, and are compatible with the components a), b) and c).

The N,N'-disubstituted urea compounds a2) are registered as CAS 80-73-9 and CAS 7226-23-5 and described, in the BASF company publication "BASF-Zwischenprodukte 1993" [BASF Intermediate Products].

The N-substituted carboxylic acid amide compounds a1) and alkali and alkali earth lactamates b) are described in U.S. Pat. No. 3,575,938.

Preferred activating compounds c) are blocked, particularly blocked with lactam, isocyanates, carbodiimides, acylated lactams, as well as oxazoline and oxazoline derivatives, in particular fatty alkyl oxazolines and their reaction products with isocyanates, Such products are described, for example, in Farben und Lacke [Paints and Lacquers] 1993/11, pp. 911 to 915.

In the process in accordance with the invention, pure anhydrous lactam is continuously taken from a storage container unmelted or in the form of a melt and brought to a continuously operating conveying and melt-mixing device with a plurality of treatment zones, preferably a twin-screw extruder. Thus, the melt of the lactam is either continuously mixed and conveyed, or it is first continuously melted, mixed and conveyed. In the process, the liquid system is advantageously added to the lactam melt with intense mixing in a constant proportion of between 0.5 to 15 weight-%.

By raising the temperature in the subsequent treatment zones to 200° to 320° C., in particular to 240° to 290° C., polymerization is accelerated so that it may takes place within 100 to 200 seconds.

In a preferred embodiment, the polymerization process includes degasification steps, in which volatile components from the melt, volatile reaction byproducts and unreacted lactam can be removed under atmospheric pressure or selectively under reduced pressure or in a vacuum.

In a last process step the polymerized melt leaves the device, preferably an extruder, through a single- or multihole nozzle, after which the polymer strands are cooled at least below their melting point, drawn off as monofilaments andcomminuted into, for example preferably cylinder-shaped granules. Then they can be supplied to subsequent further processing steps, for example by injection molding or extrusion.

In an essential process variant, the polymerized melt is directly driven to a shaping tool and is drawn off, in particular as a monofilament, tube or profiled element, by means of a process known from the prior art, and is supplied to its direct use.

In a further process variant, additional process- and/or use-related additives are admixed to the activated melt. It is also possible to admix them directly or as a master batch to the lactam which is to be conveyed, or also during any later process step.

The following are preferably used as additives and admixtures d):

processing aids, plasticizers, light and heat stabilizers, antioxidants, special flame retardante, optical brighteners, pigments, dyestuffs, tracers and aromatics, known from the prior art.

In the inventive process an activated, catalyst-containing melt stream is generated which through matching of the proportional amounts of the liquid system, the temperature control and the residence time in the extruder, is at least sufficiently polymerized to the extent that it can be directly supplied to a shaping tool, selectively with the inclusion of process steps for the addition of further components of the system, and/or melt degasing, and can be further polymerized there, if required.

The advantages of the process in accordance with the invention are the activated anionic lactam polymerization can be performed efficiently and reproducibly, it can be continuously performed, preferably in a twin-screw extruder, it is possible by employing a liquid system containing an activator and a catalyst at the same time to produce homogeneous polylactams of constant quality, the reaction of the lactam takes place rapidly and homogeneously, and is performed to a great extend after 100 to 200 seconds, the process can be directly linked to continuous shaping processes, the polymerization process requires a technical outlay which is clearly reduced over the hydrolytic polymerization, the thermal stress on the polymer is considerably reduced, The process in accordance with the invention can be expanded and employed in numerous ways. In order to achieve constant and good polymeric properties, it is advantageous to work in an inert gas and under exclusion of moisture. This should be particularly noted in connection with supplying the lactam and the additives and sidestream products, but also applies to the degasification domes and the zone of the die.

In suitable twin-screw extruders, for example of the types identified as ZSK machines of the Werner und Pfleiderer company, Stuttgart (FRG) it is possible in an advantageous manner to perform additional process tasks.

In a preferred process variant hereby they also may, following the rapidly proceeding polymerization process, additives can be introduced into the melt in accordance with the invention, and distributed therein or, if desired, made to react with the melt. For example, it is possible by means of twin-screw side extruder, for example, to continuously introduce other polymers into the freshly polymerized melt stream which, for example, act as impact modifier or polymeric plasticizer, as well as flame retardant agents, mineral fillers, fibers, such as glass fibers, carbon fibers and aramide fibers.

Further additives and admixtures with special functions, for example with a stabilizing effect, are selected from the groups of alcohols, phenols, in particular sterically hindered phenols, aliphatic and aromatic amines, silanes, tracers, complexing agents, anti-statics, carboxylic acid amides and carboxylic acid esters, and tensides.

They can be added to the melt stream as part of the liquid system, together with the plasticizer, or separately, for example directly with the initial lactam melt.

A subsequent thermal treatment of the polylactam is provided in another preferred variant as a further process step, for example just below the polylactam melting point and advantageously in a dry inert gas atmosphere. In accordance with the prior art it is then possible to improve the properties of the polymers, in particular to reduce the remaining proportion of lactam and increase the viscosity.

Temperatures of 220° C. in maximum may be employed for this in connection with PA6, and in connection with PA12 17° C. in maximum.

In further variants the process is exclusively performed for the polymerization and, if required, a modification with plasticizers, which do not hamper polymerization, in so-called single-screw extruders. Preferably so-called multi-zone screws of a suitable design of the zones, or so-called barrier screws, for example from the Maillefer company, Ecublens (CH), are preferably employed for this.

When using single-screw extruders, pumps, preferably gear pumps, are preferably used for dosing and forcing the conveyance of the lactam melt. The continuous dosing in of the liquid system, selectively together with the plasticizer and further additives, then preferably takes place just before entering into the extruder.

The invention also includes shaped polylactam bodies which can be produced in accordance with this process.

The process in accordance with the invention will be described below by way of example. However, the scope of the invention is not limited by this in any way.

DETAILED DESCRIPTION

EXAMPLES

To produce the liquid system it is compellingly necessary to work in a protective gas atmosphere.

The component a) is placed into a vessel with an interior temperature measuring device and is heated to a temperature of 60° to 80° C., maximum.

Afterwards the component c) is introduced while stirring and is homogeneously admixed. Following the formation of a clear solution and while controlling the temperature, which shall not exceed 90° C., the component b) and, if required, the additive d), are added.

The resultant solutions are liquid at room temperature and stable when stored. They do not form crusts or slag, even in dry air.

TABLE 1

Liquid Systems
Examples 1 to 3

Components

| No | a | Parts | b | Parts | c | Parts | d | Parts | e | Parts | Remarks |
|---|---|---|---|---|---|---|---|---|---|---|---|
| 1 | DMPU | 50 | NaCL | 20 | CD | 20 | — | — | — | — | yellowish, liquid to 0° C. |
| 2 | DPMU | 50 | NaCL | 58 | Bis-Ox | 58 | — | — | — | — | yellowish, liquid to 0° C. |

TABLE 1-continued

Liquid Systems
Examples 1 to 3

| | | | | | Components | | | | | |
|---|---|---|---|---|---|---|---|---|---|---|
| No | a | Parts | b | Parts | c | Parts | d | Parts | e | Parts | Remarks |
| 3 | NMP<br>CL | 50<br>12, 5 | NaCL | 12, 5 | CL-MDI | 12, 5 | — | — | — | — | yellowish,<br>liquid to 0° C. |

DMPU: N-N'-dimethylpropylene, BASF Ludwigshafen (FRG)
Na-CL: Sodium caprolactamate, Pacast AG, Sargans (CH)
Bis-Ox: Ricinyl-bisoxazoline, Loxamid 8523 ®, Henkel KG, Düsseldorf (FRG)
CL-MDI: Methylene bisphenyl isocyanate blocked with caprolactam, Grilbond IL6 ®, Ems-Chemie AG, Domat/Ems (CH)
CD: Bis-(2,6-diisopropylphenyl)-carbodiimide, Stabilisator 7000 ®, Raschig AG, Ludwigshafen (FRG)
NMP: N-methyl-2-pyrrolidone
CL: Caprolactam

Examples 4 to 6

In order to test the liquid systems for initiating the activated anionic lactam polymerization, the following procedure is used:

In a nitrogen atmosphere a lactam melt is placed into a glass vessel and the liquid system is introduced at 170° C. while stirring and so starting the polymerization. After measuring the time to the stirrer is removed and the melt is polymerized for one hour at 170° C.

TABLE 2

Lactam Polymerization
Examples 4 to 6

| | | | Components | | | | |
|---|---|---|---|---|---|---|---|
| No | Lactam | Parts | System acc. to | Parts | t seconds | Smp. Polymer °C. | Remarks |
| 4 | Laurin-lactam | 50 | Example 1 | 1 | 100 | 172 | no discoloration |
| 5 | Laurin-lactam | 50 | Example 2 | 1 | 20 | 173 | no discoloration |
| 6 | Laurin-lactam | 50 | Example 3 | 0, 5 | 15 | 172 | no discoloration | t: Time until the melt can no longer be stirred.

Examples 7 to 21

Further liquid systems are produced in the same manner as in Examples 1 to 3 and their composition is represented in Table 3.

Information regarding the performance and results of the activated anionic lactam polymerization with addition of the liquid systems are summarized in Table 4.

The procedure is the same as in Tests 4 to 6. When the melt can no longer be stirred, polymerization was continued for 60 minutes at the stated polymerization temperature, and then the viscosity of the solution and the melting point of the polymer were measured.

The remaining extractable content of all polymers was clearly below 1 weight-%.

A comparison of the different times $t_u$ shows that it is possible to affect the polymerization speed by means of the composition of the liquid system and to control the polymerization thereby.

TABLE 3

LIQUID SYSTEMS

| No | Component a) | Parts a) | Component b) | Parts b) | Component c) | Parts c) | Component d) *) | Parts d) |
|---|---|---|---|---|---|---|---|---|
| 7 | NMP<br>CL | 50<br>16.8 | Na-CL | 16.6 | CL-MDI | 16.6 | | |
| 8 | NMP | 30 | Na-CL | 30 | Bis-Ox | 10 | Rc-Ox | 30 |
| 9 | NMP | 6.6 | Na-CL | 6.6 | PCD | 6.6 | DOS | 80.2 |
| 10 | NOP | 50 | Na-CL | 25 | CD | 25 | | |
| 11 | DMI | 50 | Na-CL | 25 | CD | 25 | | |
| 12 | DMI | 60 | Na-LL | 20 | CD | 20 | | |
| 13 | DMPU | 50 | Na-CL | 30 | CL-MDI | 20 | | |
| 14 | DMPU | 48 | Na-CL | 19 | CL-MDI | 19 | PA | 14 |
| 15 | DMPU | 30 | Na-CL | 35 | Bis-Ox | 35 | | |
| 16 | TBH<br>NMP | 30<br>30 | Na-CL | 20 | CD | 20 | | |
| 17 | TEH | 55 | Na-CL | 25 | CL-MDI | 20 | | |
| 18 | TMH<br>NMP | 40<br>20 | Na-CL | 20 | CL-MDI | 20 | | |

TABLE 3-continued

LIQUID SYSTEMS

| No | Component a) | Parts a) | Component b) | Parts b) | Component c) | Parts c) | Component d) *) | Parts d) |
|---|---|---|---|---|---|---|---|---|
| 19 | TMH | 30 | | | | | | |
|  | TBH | 30 | Na-CL | 20 | Bis-Ox | 20 | | |
| 20 | TMH | 20 | | | | | | |
|  | TBH | 20 | | | | | | |
|  | NMP | 20 | Na-CL | 20 | CD | 20 | | |
| 21 | DMPU | 77 | Na-CL (100%) | 11.7 | DCC | 11.3 | | |

CL: Caprolactam
LL: Laurinlactam
NMP: N-methyl-2-pyrrolidone, BASF, Ludwigshafen (FRG)
NOP: N-octyl-2-pyrrolidone,
PCD: Polycarbodiimide Stabaxol P ®, Rhein Chemie GmbH, Mannheim (FRG)
DOS: Dioctyl sebacate, Edenol 888 ®, Henkel KG, Düsseldorf (FRG)
PA: Phenolic antioxidant, Irganox 1135 ®, Ciba-Geigy, Basel (CH)
*) Component d) additionally contains apprx. 70 weight-% of component b) (the lactam proportion)
DMPU: N,N'-dimethylpropylene urea, BASF Ludwigshafen (FRG)
DMI: N-N'-dimethylethylene urea, Siebner Hegner Rohstoffe, Zürich (CH)
TBH: Tetrabutyl urea, BASF, Ludwigshafen (FRG)
TEH: Tetraethyl urea, Fluka AG, Buchs (CH)
TMH: Tetramethyl urea, Fluka AG, Buchs (CH)
Na-CL: Sodium caprolactamate in caprolactam, apprx. 30 weight-% proportion of sodium lactamate, Pacast AG, Sargans (CH)
Na-LL: Sodium laurinlactamate in laurinlactam, apprx. 30 weight-% proportion of laurinlactamate
CD: Bis-(2,6-diisopropylphenyl)-carbodiimide, Stabilisator 7000 ®, Raschig AG, Ludwigshafen (FRG)
CL-MDI: Methylene diisocyanate blocked with caprolactam, Grilbond IL6 ®, Ems-Chemie AG, Domat/Ems (CH)
Bis-Ox: Ricinyl-bisoxazoline, Loxamid 8523 ®, Henkel KG, Düsseldorf (FRG)
Rc-Ox: Ricinyl-oxazoline, Loxamid 8513 ®, Henkel KG, Düsseldorf, (FRG)
DCC: Dicyclohexyl carbodiimide, Toyo Kasei Kogyo, Osaka (J)

TABLE 4

Use of the Liquid Systems of Examples 7 to 21 for the Lactam Polymerization

| Liquid system | Parts | Lactam | T °C. | t sec | Smp °C. | Relative Viskosity |
|---|---|---|---|---|---|---|
| 7 | 6 | CL | 140 | 70 | 211 | |
| 8 | 3 | LL | 175 | 10 | 170 | |
| 9 | 10 | LL | 175 | 320 | 176 | |
| 10 | 3 | LL | 175 | 120 | 172 | |
| 11 | 3 | LL | 175 | 80 | 175 | |
| 12 | 3 | LL | 175 | 60 | 172 | |
| 13 | 3 | LL | 175 | 22 | 172 | |
| 14 | 3 | LL | 175 | 90 | 170 | |
| 15 | 3 | LL | 175 | 10 | 171 | |
| 16 | 3 | LL | 200 | 200 | 173 | 3.05 |
| 17 | 3 | LL | 200 | 10 | 169 | nmb |
| 18 | 3 | LL | 200 | 8 | 166 | nmb |
| 19 | 3 | LL | 200 | 14 | 166 | 6.0 |
| 20 | 3 | LL | 200 | 200 | 172 | 2.9 |
| 21 | 3 | LL | 200 | 200 | 175 | 2.9 |

T: Polymerization temperature
t: Time until melt can no longer be stirred
Smp °C.: DSC melting point of the polymer
Relative solution viscosity of the polymer: 0.5% polymer dissolved in m-cresol
nmb: very high viscosity, cannot be measured by conventional methods

Example 22

With the liquid system 21, the time t as a function of the polymerization temperature T was recorded for a reaction of the lactam of more than 99 weight-%. (extractable content below 1 weight-%).

TABLE 5

| Polymerization Temp. T [°C.] | 170 | 190 | 210 | 230 | 250 | 270 |
|---|---|---|---|---|---|---|
| Total polymerization.-time [sec] | 3500 | 1500 | 900 | 500 | 270 | 170 |

In further tests, minerals, dye pigments, deforming agents and stabilizers were introduced into the lactam-12 melt, which then was polymerized by the addition of 3 weight-% of the liquid system from Example 21 at 220° C.

$Mg(OH)_2$, $Ca(OH)_2$, kaolin, micro-talc and $CaCO_3$ in the form of well-dried, powders werde added and the melt polymerized for 20 minutes at 220° C. Polymers with relative solution viscosity between 2.0 and 2.5 resulted.

When using antioxidants, such as, for example, Irganox 245®, Irgafos 168®, Tinuvin 770® of Ciba-Geigy, it was shown that, if these additives have active H-atoms, which are not sufficiently sterically shielded, a concentration of 0.5 weight-% of these stabilizers should not be exceeded.

Proportional amounts of clearly less than 1 weight-% are used in connection with defoaming agents and release agents.

0.05 weight-% of the mold release agent Bruggolen P12® of the Bruggemann company, Heilbronn (FRG) were sufficient for perfect removal of the shaped elements from the mold.

Continuous Tests in a Twin-screw Extruder

The above tests now have shown that the course of polymerization can be considerably affected by the changes of the composition of the liquid system and the temperature control.

In this way it is possible to considerably accelerate the polymerization of Lactam 12 by increasing the melt temperature, without enlarging the extractable content, this in contrast to the well known effects in the case of Lactam-6.

In order to record the particular suitability of the process in accordance with the invention, a continuously proceeding polymerization process was performed with a synchronously operating twin-screw extruder, a ZSK 30 with an l/d ratio of 32 of the Werner und Pfleiderer company, Stuttgart (FRG). The liquid systems listed in Table 6 were used for this.

TABLE 6

| No | Component a) | Parts a) | Component b) | Parts b) | Component c) | Parts c) | Component d) | Parts d) |
|---|---|---|---|---|---|---|---|---|
| 22 | DMPU | 50 | Na-CL | 25 | CL-MDI | 35 | | |
| 23 | DMPU | 50 | Na-CL | 25 | Bis-Ox | 25 | | |
| 24 | DMPU | 50 | Na-CL | 20 | Bis-Ox/CD | 15/7.5 | E.W. 3005 | 37.5 |

In this case components a), b) and c) correspond to well-known products in accordance with Table 3. E.W.3005 means Edenol W3005 and is an ester plasticizer of Henkel AG, Dusseldorf (FRG).

Stable liquid systems resulted from tests 22, 23, 24, which are excellently suited to initiate the polymerization of Lactam-12. Component d) from test 24 is additionally used for plastification, and the system is constructed in such a way that it is thus necessary to add it in a higher fraction of it.

In the course of the continuous extruder polymerization, the lactam was melted in the inlet zone of the extruder and the liquid system was thereafter continuously pumped to the lactam melt in a defined weight proportion and under intensive mixing.

The data from these tests are summarized in Table 7.

TABLE 7

| | Test No. | | 25 | 26 | 27 | 28 | 29 | 30 |
|---|---|---|---|---|---|---|---|---|
| Recipe | Lactam-12 | % | 92 | 95, 6 | 95, 6 | 87 | 90 | 92 |
| | Liquidsyst. No. 22 | % | 8 | | | | | |
| | Liquidsyst. No. 23 | % | | 4, 4 | 4, 4 | | | |
| | Liquidsyst. No. 24 | % | | | | 13 | 10 | 8 |
| Production- | RPM | | 100 | 100 | 100 | 150 | 150 | 150 |
| parameters | Output | kg/h | 3, 8 | 6, 8 | 6, 8 | 6, 7 | 8, 7 | 10, 87 |
| | av. melt-temperature | [°C.] | 300 | 300 | 278 | 258 | 260 | 260 |
| Polymer- | rel. Solution viscosity | | 2, 18 | 2, 34 | 2, 60 | 1, 58 | 1, 87 | 1, 98 |
| Properties | SMP of Polymer | [°C.] | 163 | 164 | 158 | | | |
| | Extractable content | %[1] | | | | — | 10, 2 | 14, 8 |

[1] The extractable content also includes the plasticizer from system 24, the E.W. 3005

These are some examples of test set-ups and results from the multitude of tests made. Homogeneous extrusion strands, which were easy to pelletize, were the result in all cases. Tests with dried minerals and with chopped glass, as well as the many variation possibilities of the twin-screw extruder show that together or following polymerization of the lactam a multitude of process steps, such as reinforcement with mineral and glass, dys and stabilizers, the addition of flame retardents and impact modifiers, and combinations of all that are possible.

Granules from this continuous polymerization process can be melted again and further processed, optionally after extraction of residual monomer for example in an injection molding process. However, because of the continuity of the process it is also possible to use as die directly a shaping tool and in this way to produce, for example, glass-reinforced profiles or plasticized tubes directly, which can later also be thermally treated and/or postformed.

What is claimed is:

1. A continuous process for activated lactam polymerization, with the steps of supplying lactam as well as catalyst and activator for the anionic lactam polymerization under anhydrous conditions to a heatable, continuously operating mixing and conveying device, and heating the lactam to the process temperature with continuous mixing, and at least partial polymerization, and shaping in a tool or delivering the melt as a strand, then cooling and pelletizing, characterized in that the introduction of activator and catalyst into an anhydrous lactam melt is performed by the continuous dosing in of a liquid system in which both activator and catalyst are contained.

2. The continuous process in accordance with claim 1, characterized in that lactam, selected from the group of caprolactam, enantholactam, laurinlactam and their mixtures, is used.

3. The continuous process in accordance with claim 2, characterized in that the liquid system essentially consists of a) 20 to 80 parts by weight of a1) at least one N-substituted carboxylic acid amide compound, and/or a2) at least one N,N'-disubstituted urea compound, both of which can also contain a heterocyclic ring formed by their substituents, as the base component and solvent, b) 5 to 30 parts by weight of at least one alkali or alkali earth lactamate as catalyst, c) 5 to 30 parts by weight of at least one compound activating the anionic lactam polymerization, wherein a), b) and c) add up to 100 parts by weight, and additionally selectively d) process- or use-dependent additives and admixtures are used.

4. The continuous process in accordance with claim 3, characterized in that 0.5 to 15 parts by weight of the liquid system are added to 100 parts by weight of lactam melt.

5. The continuous process in accordance with claim 1, characterized in that additives from the group of process- and use-dependent additives in accordance with the prior art are added to the still low-viscosity melt.

6. The continuous process in accordance with claim 4, characterized in that a twin-screw extruder, or a co-kneader, or a single-screw extruder combined with a conveying pump at the inlet, are used as mixing and conveying means.

7. The continuous process in accordance with claim 4, characterized in that the melt is at least partially polymerized by matching of the proportional amount of the liquid system, the temperature control and the residence time, and subsequently is conducted to shaping, whereby intermediate steps for the addition of additives and/or degasing are selectively integrated.

8. The continuous process in accordance with claim 4, characterized in that the lactam melt is at least partially polymerized in the extruder and is fully polymerized below the melting point of polylactam while shaping and/or in a successive step.

9. The continuous process in accordance with claim 8, characterized in that the temperature of the melt is raised above the melting point of the polymer in the range of 200° to 320° C.

10. The continuous process in accordance with claim 9, characterized in that degasing is performed under atmospheric pressure or reduced pressure.

11. The continuous process in accordance with claim 10, characterized in that shaping into monofilaments, tubes, plates or profiles is performed.

12. The continuous process in accordance with claim 10, characterized in that the thermal post-treatment takes place preferably in an inert enviroment atmosphere at a temperature below the melting point of the polylactam.

13. The continuous process in accordance with claim 1, characterized in that the post-treatment is a liquid extraction.

14. A shaped polyamide body which can be produced in accordance with the continuous process of at least claim 1.

15. The continuous process in accordance with claim 1, characterized in that the liquid system essentially consists of a) 20 to 80 parts by weight of a1) at least one N-substituted carboxylic acid amide compound, and/or a2) at least one N,N'-distributed urea compound, both of which can also contain a heterocyclic ring formed by their substituents, as the base component and solvent b) 5 to 30 parts by weight of at least one alkali or alkali earth lactamate as catalyst, c) 5 to 30 parts by weight of at least one compound activating the anionic lactam polymerization, wherein a), b) and c) add up to 100 parts by weight, and that additionally selectively d) process- or use-dependent additives and admixtures are used.

16. The continuous process in accordance with claim 1, characterized in that 0.5 to 15 parts by weight of the liquid system are added to 100 parts weight of lactam melt.

17. The continuous process in accordance with claim 1, characterized in that the melt is at least partially polymerized by matching of the proportional amount of the liquid system, the temperature control and the residence time, and subsequently is conducted to shaping, whereby intermediate steps for the addition a of additives and/or degasing are selectively integrated.

18. The continuous process in accordance with claim 1, characterized in that the lactam melt is at least partially polymerized in the extruder and is fully polymerized below the melting point of polylactam while shaping and/or in a successive step.

19. The continuous process in accordance with claim 2, characterized in that the temperature of the melt is raised above the melting point of the polymer in the range of 200° to 320° C.

20. The continuous process in accordance with claim 1, characterized in that degasing is performed under atmospheric pressure or reduced pressure.

21. The continuous process in accordance with claim 1, characterized in that shaping into monofilaments, tubes, plates or profiles is performed.

22. The continuous process in accordance with claim 1, characterized in that the thermal post-treatment takes place preferably in an inert environment atmosphere at a temperature below the melting point of the polylactam.

\* \* \* \* \*